US012812702B2

(12) United States Patent
Wu

(10) Patent No.: US 12,812,702 B2
(45) Date of Patent: *Nov. 24, 2026

(54) METHOD OF CONFIGURING SERVICE DATA ADAPTATION PROTOCOL ENTITY AND DEVICE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 204 days.

This patent is subject to a terminal disclaimer.

(21) Appl. No.: 17/853,826

(22) Filed: Jun. 29, 2022

(65) Prior Publication Data

US 2022/0330356 A1 Oct. 13, 2022

Related U.S. Application Data

(63) Continuation of application No. 17/037,391, filed on Sep. 29, 2020, now Pat. No. 11,968,728, which is a (Continued)

(30) Foreign Application Priority Data

Apr. 2, 2018 (CN) ......................... 201810284821.0

(51) Int. Cl.
*H04W 76/12* (2018.01)
*H04W 76/11* (2018.01)

(52) U.S. Cl.
CPC ............ *H04W 76/11* (2018.02); *H04W 76/12* (2018.02)

(58) Field of Classification Search
CPC ..... H04W 76/11; H04W 76/12; H04W 76/22; H04W 76/15; H04W 28/02; H04L 41/0803
See application file for complete search history.

(56) References Cited

U.S. PATENT DOCUMENTS

2009/0092079 A1 4/2009 Marinier et al.
2015/0094073 A1* 4/2015 Peng .................... H04W 76/12 455/450

(Continued)

FOREIGN PATENT DOCUMENTS

CN 107637123 A 1/2018
JP 2019-121829 A 7/2019

(Continued)

OTHER PUBLICATIONS

3GPP331 (3GPP TS 38.331 v15.1.0, NR, Radio Resource Control (RRC) protocol specification, Mar. 2018, IDS Jul. 23, 2021).*

(Continued)

*Primary Examiner* — Lakeram Jangbahadur
(74) *Attorney, Agent, or Firm* — BROOKS KUSHMAN P.C.

(57) ABSTRACT

A method of configuring a Service Data Adaptation Protocol (SDAP) entity and a terminal device are provided, and the method includes: receiving configuration information, where the configuration information includes an identifier of a DRB to be configured, and a PDU session identifier corresponding to the DRB to be configured; configuring, according to the configuration information, the DRB to be configured and a target SDAP entity corresponding to the PDU session identifier.

7 Claims, 3 Drawing Sheets

Related U.S. Application Data continuation of application No. PCT/CN2019/080092, filed on Mar. 28, 2019.

(56) References Cited

U.S. PATENT DOCUMENTS

| | | | | |
|---|---|---|---|---|
| 2018/0083688 | A1* | 3/2018 | Agiwal | H04W 80/02 |
| 2019/0166646 | A1* | 5/2019 | Shih | H04W 72/04 |
| 2020/0154498 | A1* | 5/2020 | Wang | H04W 76/12 |
| 2020/0178113 | A1* | 6/2020 | Jin | H04W 76/11 |
| 2020/0396789 | A1 | 12/2020 | Hori et al. | |
| 2021/0168882 | A1* | 6/2021 | Chang | H04W 76/30 |

FOREIGN PATENT DOCUMENTS

| | | | | |
|---|---|---|---|---|
| KR | 10-2010-0068295 | A | 6/2010 | |
| KR | 10-2011-0003384 | A | 1/2011 | |
| KR | 10-2018-0015589 | A | 2/2018 | |
| WO | 2018/026169 | A1 | 2/2018 | |
| WO | 2018/030798 | A1 | 2/2018 | |
| WO | WO-2018228328 | A1 * | 12/2018 | H04W 28/24 |

OTHER PUBLICATIONS

Huawei (Initiation of SDAP Entity, R2-1706789, Jun. 2017, IDS Jul. 23, 2021).*

Huawei977 (QOS message flows, R2-1704977, May 2017, IDS Jul. 23, 2021).*

VIVO (Discussion on the configuration of SDAP, R2-1710933, Oct. 2017, IDS Mar. 19, 2021).*

U.S. Final Office Action dated Jan. 23, 2023 as received in U.S. Appl. No. 17/037,391.

Huawei. et al., "QoS message flows," 3GPP TSG-RAN WG2 Meeting #98, R2-1704977, pp. 1-3, (May 2017).

Huawei. et al., "Initiation of SDAP Entity," 3GPP TSG-RAN WG2 Meeting Adhoc#2, R2-1706789, (Revision of R2-1704986) pp. 1-2, (Jun. 2017).

Vivo., "Discussion on the configuration of SDAP," 3GPP TSG-RAN WG2 Meeting #99bis, R2-1710933 (Revision of R2-1708500), pp. 1-5, (Oct. 13, 2017).

Huawei., "SDAP (Re)Configuration," 3GPP TSG-RAN WG2 Meeting #99bis, R2-1710227, pp. 1-3, (Oct. 2017).

Vivo., "Discussion on the configuration of SDAP," 3GPP TSG-RAN WG2 Meeting #99, R2-1710933 (Revision of R2-1708500), pp. 1-5, (Oct. 2017).

Ericsson., "SDAP Configuration Aspects," 3GPP TSG-RAN WG2 NR AH#1801, Tdoc R2-1800699, pp. 1-5, (Jan. 2018).

"3rd Generation Partnership Project; Technical Specification Group Radio Access Network; NR; Radio Resource Control (RRC) protocol specification (Release 15)," 3GPP TS 38.331, V15.1.0, pp. 1-268 (Mar. 2018).

"3rd Generation Partnership Project; Technical Specification Group Radio Access Network; Access Network; E-UTRA and NR; Service Data Adaptation Protocol (SDAP) specification (Release 15)," 3GPP TS 37.324, V1.2.0, pp. 1-11 (Mar. 2018).

Ericsson., "SDAP Configuration Aspects," 3GPP TSG-RAN WG2 #101, Tdoc R2-1803158, pp. 1-5, (Mar. 2018).

Written Opinion of the International Searching Authority dated Jul. 2, 2019 as received in Application No. PCT/CN2019/080092.

CN Office Action dated Mar. 23, 2020 as received in Application No. 201810284821.0.

JP Office Action dated Jul. 25, 2020 as received in Application No. 2020-554263.

Extended European Search Report dated Apr. 29, 2021 as received in Application No. 197822224.4.

KR Office Action dated Sep. 28, 2021 as received in Application No. 10-2020-7030779.

U.S. Office Action dated Nov. 29, 2021 as received in U.S. Appl. No. 17/037,391.

* cited by examiner

METHOD OF CONFIGURING SERVICE DATA ADAPTATION PROTOCOL ENTITY AND DEVICE

CROSS-REFERENCE TO RELATED APPLICATION

The present application claims the benefit of and is a continuation application of U.S. patent application Ser. No. 17/037,391 filed on Sep. 29, 2020 which is a continuation application of PCT Application No. PCT/CN2019/080092 filed on Mar. 28, 2019, which claims a priority to the Chinese patent application No. 201810284821.0 filed in China on Apr. 2, 2018, a disclosure of which is incorporated herein by reference in their entireties.

TECHNICAL FIELD

The present disclosure relates to the field of communications technologies, and in particular, related to a method of configuring a Service Data Adaptation Protocol (SDAP) entity and a device.

BACKGROUND

With development of communications technology, there has been fifth generation (fifth-generation, 5G) mobile communications technology. A network-side indication mechanism for quality of service (Quality of Service, QoS) is introduced in the 5G system. It is necessary to include information indicating Qos of Internet Protocol (IP) data flow (e.g., a QoS flow ID) of a terminal device during transmission of uplink and downlink data. Therefore, a new protocol layer, a service data adaptation protocol (Service Data Adaptation Protocol, SDAP) layer, is introduced on the existing packet data convergence protocol (Packet Data Convergence Protocol, PDCP) layer.

One SDAP entity corresponds to one high-level packet data unit (Packet Data Unit, PDU) session, and an SDAP entity may send multiple data streams to multiple different data radio bearers (Data Radio Bearer, DRB), where one DRB corresponds to one PDCP entity.

In the related art, when an SDAP entity of a terminal device is configured, a network-side device generally sends configuration instructions to the terminal device. However, configuration signaling requires a certain amount of overhead, which leads to increased overhead when an SDAP entity configuration is performed.

SUMMARY

The embodiment of the present disclosure is to provide a computer readable storage medium to reduce overhead for an SDAP entity configuration.

In order to solve the technical issue described above, an embodiment of the present disclosure is implemented as follows:

In a first aspect, a computer readable storage medium storing a computer program is provided in the present disclosure, where a processor executes the computer program to:

receive configuration information configure, according to the configuration information, a data radio bearer (DRB) and a target SDAP entity corresponding to a PDU session identifier;

the configuration information includes an identifier of the DRB and the PDU session identifier corresponding to the DRB, where one SDAP entity corresponds to one PDU session;

the configuration information is configured to indicate an establishment of the DRB;

the processor executes the computer program to:

establish the DRB and the target SDAP entity, in a case that the target SDAP entity is not established;

or the configuration information is configured to instruct modifying the DRB corresponding to a first SDAP entity to correspond to the target SDAP entity;

the processor executes the computer program to:

establish the target SDAP entity and a corresponding relationship between the DRB and the target SDAP entity, in a case that the target SDAP entity is not established;

in a case that the DRB is an entirety of DRBs corresponding to the first SDAP entity, the processor executes the computer program to:

delete the first SDAP entity;

or the configuration information includes an identifier of the DRB, where one SDAP entity corresponds to one PDU session;

the configuration information is configured to indicate a deletion of the DRB;

the processor executes the computer program to:

delete the DRB and the target SDAP entity, in a case that the target SDAP entity is established and the DRB is an entirety of DRBs corresponding to the target SDAP entity.

Optionally, one DRB corresponds to one SDAP entity in the configuration information.

Optionally, the configuration information further includes: a protocol data unit (PDU) session identifier corresponding to the SDAP entity identifier;

the processor executes the computer program to:

delete a corresponding relationship between the target SDAP entity and a target PDU session corresponding to the PDU session identifier.

In a second aspect, a computer readable storage medium storing therein a computer program is further provided in the present disclosure, where a processor executes the computer program to:

send configuration information;

the configuration information is configured to enable a terminal device to configure a data radio bearer (DRB) and a target SDAP entity corresponding to a PDU session identifier according to the configuration information.

the configuration information includes an identifier of the DRB and the PDU session identifier corresponding to the DRB, where one SDAP entity corresponds to one PDU session;

the configuration information is configured to indicate an establishment of the DRB;

the configuration information is further configured to, in a case that the target SDAP entity is not established, enable the terminal device to establish the DRB and the target SDAP entity according to the configuration information;

or the configuration information is configured to instruct modifying the DRB corresponding to a first SDAP entity to correspond to the target SDAP entity;

wherein in a case that the DRB is an entirety of DRBs corresponding to the first SDAP entity, the configuration information is further configured to enable the terminal to delete the first SDAP entity according to the configuration information;

or the configuration information includes an identifier of the DRB, where one SDAP entity corresponds to one PDU session;

the configuration information is configured to indicate a deletion of the DRB;

the configuration information is further configured to, in a case that the target SDAP entity is established and the DRB is an entirety of DRBs corresponding to the target SDAP entity, delete the DRB and the target SDAP entity according to the configuration information.

Optionally, one DRB corresponds to one SDAP entity in the configuration information.

In a third aspect, a network-side device is further provided in the present disclosure, including:

a storage, a processor, and a program stored on the storage and executable by the processor, where the processor executes the computer program to:

send configuration information;

the configuration information is configured to enable a terminal device to configure a data radio bearer (DRB) and a target SDAP entity corresponding to a PDU session identifier according to the configuration information.

the configuration information includes an identifier of the DRB and the PDU session identifier corresponding to the DRB, where one SDAP entity corresponds to one PDU session;

the configuration information is configured to indicate an establishment of the DRB;

the configuration information is further configured to, in a case that the target SDAP entity is not established, enable the terminal device to establish the DRB and the target SDAP entity according to the configuration information;

or the configuration information is configured to instruct modifying the DRB corresponding to a first SDAP entity to correspond to the target SDAP entity;

the configuration information is further configured to, in a case that the target SDAP entity is not established, enable the terminal to establish the target SDAP entity and a corresponding relationship between the DRB and the target SDAP entity according to the configuration information;

in a case that the DRB is an entirety of DRBs corresponding to the first SDAP entity, the configuration information is further configured to enable the terminal to delete the first SDAP entity according to the configuration information;

or the configuration information includes an identifier of the DRB, where one SDAP entity corresponds to one PDU session;

the configuration information is configured to indicate a deletion of the DRB;

the configuration information is further configured to, in a case that the target SDAP entity is established and the DRB is an entirety of DRBs corresponding to the target SDAP entity, delete the DRB and the target SDAP entity according to the configuration information.

Optionally, one DRB corresponds to one SDAP entity in the configuration information.

In computer readable storage medium provided in an embodiment of the present disclosure, configuration of a target SDAP entity corresponding to a SDAP entity identifier may be realized by configuring a DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity again, and overhead for configuring the SDAP entity is reduced.

BRIEF DESCRIPTION OF THE DRAWINGS

The drawings described herein are used to provide a further understanding of the present disclosure and constitute a part of the present disclosure. The exemplary embodiments of the present disclosure and the description thereof are used to explain the present disclosure, and do not constitute an improper limitation on the present disclosure. In the drawings.

DETAILED DESCRIPTION

The technical solutions of embodiments of the present disclosure will be clearly described below with reference to the drawings of embodiments of the present disclosure, apparently, the described embodiments are some embodiments of the present disclosure, but are not all the embodiments. Based on embodiments of the present disclosure, all other embodiments derived by a person of ordinary skill in the art shall fall within the scope of the present disclosure. "And/or" used in the specification and claims means at least one of connected objects.

The technical solution of the present disclosure may be applied to various communication systems, such as: a global system of mobile communication (Global System of Mobile communication, GSM) system, a code division multiple access (Code Division Multiple Access, CDMA) system, and a wideband code division multiple access (Wideband Code Division Multiple Access, WCDMA) system, a general packet radio service (General Packet Radio Service, GPRS) system, a long term evolution (Long Term Evolution, LTE)/long term evolution advanced (Long Term Evolution advanced, LTE-A) system, and a new radio (New Radio, NR) system, etc.

UE may also be referred to as a user terminal, a mobile terminal (Mobile Terminal), a mobile user equipment, and so on. The UE may communicate with one or more core networks via a wireless access network, e.g., radio access network (Radio Access Network, RAN). The terminal device may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network.

A network-side device, used to communicate with a terminal device, may be a base transceiver station (Base Transceiver Station, BTS) in GSM or CDMA, a base station (NodeB) in WCDMA, or an evolved base station (evolutional Node B, eNB or e-NodeB) in LTE and a 5G base station (gNB), which is not limited in an embodiment of the present disclosure, but for the convenience of description, the gNB is taken as an example for description in the following embodiments.

The technical solutions provided in various embodiments of the present disclosure will be described in detail below with reference to the accompanying drawings.

The abbreviations involved in the present disclosure are annotated below.

Service Data Adaptation Protocol (Service Data Adaptation Protocol, SDAP);

Data Radio Bearer (Data Radio Bearer, DRB);

Packet Data Convergence Protocol (Packet Data Convergence Protocol, PDCP);

Protocol Data Unit (Protocol Data Unit, PDU);

Non-access stratum (Non-access stratum, NAS).

Figure 1:
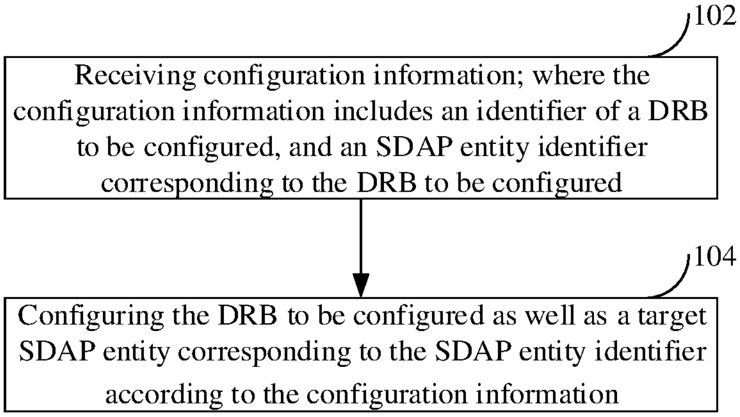
FIG. 1 is a first method flowchart of a method of configuring a Service Data Adaptation Protocol (SDAP) entity according to an embodiment of the present disclosure.

A method of configuring a Service Data Adaptation Protocol (SDAP) entity is provided in an embodiment of the present disclosure. The method is applied to a terminal device and performed by a terminal device. FIG. 1 is a flowchart of a method of configuring an SDAP entity provided in an embodiment of the present disclosure. As shown in FIG. 1, the method includes:

Step 102: receiving configuration information, where the configuration information includes an identifier of a DRB to be configured, and an SDAP entity identifier corresponding to the DRB to be configured.

Specifically, the configuration information received in Step 102 may be sent by a network side device. The above identifier of the DRB may be a unique identification (identification, ID) of the DRB, and the above SDAP entity identifier may be an ID of the SDAP entity.

There may be one or more DRBs to be configured in the above configuration information, and there may be one or more SDAP entities in the above configuration information. However, one DRB to be configured corresponds to one SDAP entity, that is, one DRB may only be configured to one SDAP entity. However, one SDAP entity may correspond to multiple DRBs.

Figure 2:
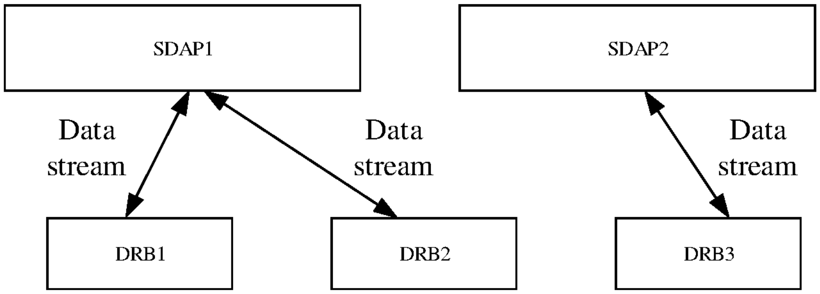
FIG. 2 is a schematic diagram of a corresponding relationship between a DRB and an SDAP entity in a method of configuring a Service Data Adaptation Protocol (SDAP) entity according to an embodiment of the present disclosure.

For example, in the configuration information, DRBs to be configured are DRB1, DRB2 and DRB3, DRB1 and DRB2 correspond to SDAP1, and DRB3 corresponds to SDAP2, that is, both DRB1 and DRB2 are configured to correspond to SDAP1, and DRB3 is configured to correspond to SDAP2. In this case, DRB1 and DRB2 may no longer be configured to correspond to SDAP2. Similarly, DRB3 may no longer be configured to correspond to SDAP1. In this case, a corresponding relationship of DRB1, DRB2 and DRB3 with SDAP1 and SDAP2 is shown in FIG. 2.

In an embodiment of the present disclosure, one DRB may only correspond to one SDAP entity, so that the DRB may know exactly which SDAP entity to send data to, thereby avoiding confusion of sending data in a case that one DRB corresponds to multiple SDAP entities and the DRB is not sure which SDAP entity to send data to.

Step 104: configuring, according to the configuration information, the DRB to be configured and a target SDAP entity corresponding to the SDAP entity identifier.

Specifically, in an embodiment of the present disclosure, the configuring the DRB to be configured may include deleting or establishing the DRB to be configured, or modifying an SDAP entity corresponding to the DRB to be configured, etc. The configuring the target SDAP entity corresponding to the SDAP entity identifier may include deleting the target SDAP entity, or establishing the target SDAP entity, etc.

In an embodiment of the present disclosure, the received configuration information includes the identifier of the DRB to be configured and the SDAP entity identifier corresponding to the DRB to be configured, the DRB to be configured is configured according to the configuration information, and configuration of the target SDAP entity corresponding to the SDAP entity identifier may be implemented through the configuration of the DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity again, and overhead for configuring the SDAP entity is reduced.

In a specific embodiment of the present disclosure, the configuration information is configured to indicate an establishment of the DRB to be configured;

Correspondingly, in Step 104, the configuring the DRB to be configured and the target SDAP entity corresponding to the SDAP entity identifier according to the configuration information specifically includes:

establishing the DRB to be configured and the target SDAP entity in a case that the target SDAP entity is not established.

Specifically, in an embodiment of the present disclosure, after the terminal device receives the configuration information, the terminal device checks whether the target SDAP entity is established currently or not. The terminal device establishes the aforementioned DRB to be configured and the target SDAP entity, and also needs to establish a corresponding relationship between the DRB to be configured and the target SDAP entity in a case that the target SDAP entity has not been established.

The terminal device only needs to establish the DRB to be configured and the corresponding relationship between the DRB to be configured and the target SDAP entity in a case that the terminal device has already established the target SDAP entity.

In an embodiment of the present disclosure, establishment of the DRB to be configured is indicated through the configuration information, the terminal device itself may be triggered to check whether the target SDAP entity is established or not. If the target SDAP entity is not established, the terminal device is triggered to establish the target SDAP entity, so that the network-side device does not need to send configuration signaling for establishing the target SDAP entity, which saves overhead of the configuration signaling for establishing the target SDAP entity, thereby reducing overhead for configuring the SDAP entity.

Figure 3:
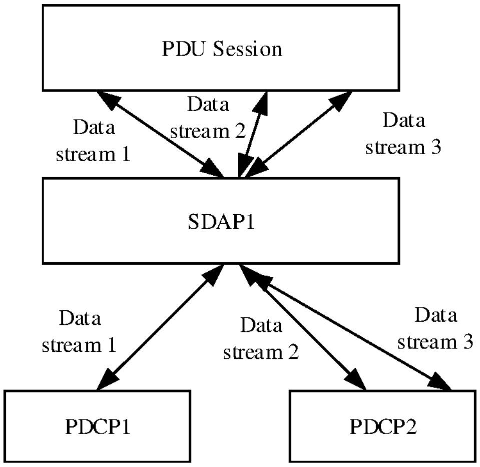
FIG. 3 is a schematic diagram of a corresponding relationship between an SDAP entity, a PDU session, and a PDCP entity in a method of configuring a Service Data Adaptation Protocol (SDAP) entity according to an embodiment of the present disclosure.

In addition to the SDAP entity corresponding to the DRB, the SDAP entity also corresponds to a high-layer PDU session, and one SDAP entity corresponds to one PDU session, where a corresponding relationship between the SDAP entity, the PDU session, and the DRB is shown in FIG. 3.

In the corresponding relationship between the SDAP entity, the PDU session, and a PDCP entity corresponding to the DRB shown in FIG. 3, one DRB corresponds to one PDCP entity. In the case shown in FIG. 3, a case where one SDAP entity corresponds to two PDCPs are listed. In fact, a number of PDCP entities corresponding to one SDAP entity is not limited to this.

Therefore, in an embodiment of the present disclosure, the configuration information further includes a PDU session identifier corresponding to the SDAP entity identifier;

Correspondingly, subsequent to the establishing the DRB to be configured and the target SDAP entity, the method provided in an embodiment of the present disclosure further includes:

- establishing a corresponding relationship between the target SDAP entity and a target PDU session corresponding to the PDU session identifier.

In addition, in an embodiment of the present disclosure, after receiving data, the target PDCP entity corresponding to the DRB to be configured may send the data to the target SDAP entity after a corresponding relationship between the DRB to be configured and the target SDAP entity is established, thereby realizing data transmission between the DRB to be configured and the target SDAP entity.

In a specific embodiment of the present disclosure, the configuration information is configured to instruct modifying a first SDAP entity corresponding to the DRB to be configured to the target SDAP entity;

Correspondingly, in Step 104, the configuring the DRB to be configured and the target SDAP entity corresponding to the SDAP entity identifier according to the configuration information includes:

- establishing the target SDAP entity and a corresponding relationship between the DRB to be configured and the target SDAP entity in a case that the target SDAP entity is not established.

The modifying the first SDAP entity corresponding to the DRB to be configured to the target SDAP entity refers to modifying a corresponding relationship of the DRB that already exist on the terminal device. That is, the DRB to be configured on the terminal device originally corresponds to the first SDAP entity, and the corresponding relationship of the DRB to be configured needs to be modified to a corresponding relationship between the DRB to be configured and the target SDAP entity, that is, it is necessary to release the correspondence between the DRB to be configured and the first SDAP entity, and establish the correspondence between the DRB to be configured and the target SDAP entity.

In this case, after the terminal device receives the configuration information, the terminal device checks whether the target SDAP entity is established or not. If the target SDAP entity has not been established, the target SDAP entity needs to be established and the corresponding relationship between the DRB to be configured and the target SDAP entity needs to be established, and the corresponding relationship between the DRB to be configured and the target SDAP entity is released at the same time.

The terminal device only needs to establish the corresponding relationship between the DRB to be configured and the target SDAP entity and release the corresponding relationship between the DRB to be configured and the first SDAP entity in a case that the terminal device has already established the target SDAP entity.

In an embodiment of the present disclosure, an SDAP entity corresponding to the DRB to be configured that already exists on the terminal device is indicated to modify through the configuration information, the terminal device itself may be triggered to check whether the target SDAP entity is established or not. If the target SDAP entity is not established, the terminal device is triggered to establish the target SDAP entity, so that the network-side device does not need to send configuration signaling for establishing the target SDAP entity, which saves overhead of the configuration signaling for establishing the target SDAP entity, thereby reducing overhead for configuring the SDAP entity.

In a specific embodiment of the present disclosure, in a case that the DRB to be configured is an entirety of DRBs corresponding to the first SDAP entity, the method provided in an embodiment of the present disclosure further includes:

deleting the first SDAP entity.

For example, in a specific implementation, the first SDAP entity corresponds to three DRBs, which are recorded as DRB1, DRB2 and DRB3, respectively. If the DRBs to be configured in the configuration information happen to be DRB1, DRB2 and DRB3, after a corresponding relationship of DRB1, DRB2 and DRB3 with the target SDAP entity is established, and a corresponding relationship of DRB1, DRB2 and DRB3 with the first SDAP entity is deleted, the first SDAP entity does not have a corresponding DRB, and at this time, the terminal device is triggered to delete the first SDAP entity.

In an embodiment of the present disclosure, in a case that the configuration information is configured to instruct modifying an SDAP entity corresponding to the DRB to be configured that already exists on the terminal device, if the DRB to be configured is an entirety of DRBs corresponding to the first SDAP entity, the terminal device may be triggered to delete the first SDAP entity at this time, so that the network-side device does not need to send configuration signaling for deleting the first SDAP entity again, which saves overhead of the configuration signaling for establishing the first SDAP entity, thereby reducing overhead for configuring the SDAP entity.

In addition, in another specific embodiment of the present disclosure, the configuration information is configured to indicate a deletion of the DRB to be configured;

In this case, in Step 104, the configuring the DRB to be configured and the target SDAP entity corresponding to the SDAP entity identifier according to the configuration information includes:

- deleting the DRB to be configured and the target SDAP entity in a case that the target SDAP entity is established and the DRB to be configured is an entirety of DRBs corresponding to the target SDAP entity.

Specifically, in an embodiment of the present disclosure, if the configuration information is configured to indicate a deletion of the DRB to be configured, after the terminal device receives the configuration information, the terminal device detects whether the target SDAP entity is established or not, and determines whether the DRB to be configured is an entirety of DRBs corresponding to the target SDAP entity. If the DRB to be configured is an entirety of DRBs corresponding to the target SDAP entity, the DRB to be configured and the target SDAP entity are deleted; if the DRB to be configured is not an entirety of DRBs corresponding to the target SDAP entity, the terminal device only needs to delete the DRB to be configured.

For example, the DRBs to be configured included in the configuration information are DRB1, DRB2 and DRB3, DRB1, DRB2 and DRB3 all correspond to SDAP entity 1, and DRB1, DRB2 and DRB3 are all DRBs corresponding to SDAP entity 1. SDAP entity 1 is deleted at the same time as DRB1, DRB2 and DRB3 in a case that the above configuration information is configured to indicate a deletion of DRB1, DRB2 and DRB3.

In an embodiment of the present disclosure, deletion of the DRB to be configured is indicated through the configuration information, the terminal device may be triggered to delete the target SDAP entity in a case that the terminal device detects that the target SDAP entity corresponding to the DRB is established and the DRB to be configured is an entirety of the DRBs corresponding to the target SDAP entity. Thus, when a number of DRBs corresponding to the target SDAP entity is detected to be zero, the terminal device may be triggered to directly delete the target SDAP entity, so that the network-side device does not need to send configuration signaling for deleting the target SDAP entity, which saves overhead of the configuration signaling for deleting the target SDAP entity, thereby reducing overhead for configuring the SDAP entity.

In addition, in an embodiment of the present disclosure, when the target SDAP entity is deleted, the PDU session corresponding to the target SDAP entity does not have a corresponding SDAP entity, thus the PDU session corresponding to the target SDAP entity is also deleted. Therefore, in an embodiment of the present disclosure, the configuration information further includes a PDU session identifier corresponding to the SDAP entity identifier.

Correspondingly, subsequent to the deleting the DRB to be configured and the target SDAP entity, the method provided in an embodiment of the present disclosure further includes:

deleting a corresponding relationship between the target SDAP entity and a target PDU session corresponding to the PDU session identifier.

In addition, in an embodiment of the present disclosure, in order to avoid a case that an NAS sends data to a deleted SDAP entity, a message that the target SDAP entity is deleted needs to be notified to the NAS. Therefore, the method provided in an embodiment of the present disclosure further includes:

sending a deletion notification message to an NAS entity, where the deletion notification message is configured to notify the NAS entity that the target SDAP entity is deleted.

Specifically, the deletion notification message may be sent to the NAS at the same time as the target SDAP entity is deleted, or after the target SDAP entity is deleted.

In an embodiment of the present disclosure, the NAS may be prevented from continuing to send data to the target SDAP entity, by notifying the NAS of the message that the target SDAP entity has been deleted.

The deletion notification message includes at least one of:

the SDAP entity identifier corresponding to the target SDAP entity;

the PDU session identifier of the target PDU session corresponding to the target SDAP entity;

the identifier of the DRB corresponding to the target SDAP entity.

Specifically, the deletion notification message may include one, two or three of the SDAP entity identifier corresponding to the target SDAP entity, the PDU session identifier corresponding to the target PDU session corresponding to the target SDAP entity, and the identifier of the DRB corresponding to the target SDAP entity.

In a method of configuring a Service Data Adaptation protocol (SDAP) entity provided in an embodiment of the present disclosure, configuration of a target SDAP entity corresponding to a SDAP entity identifier may be realized by configuring a DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity again, and overhead for configuring the SDAP entity is reduced.

Figure 4:
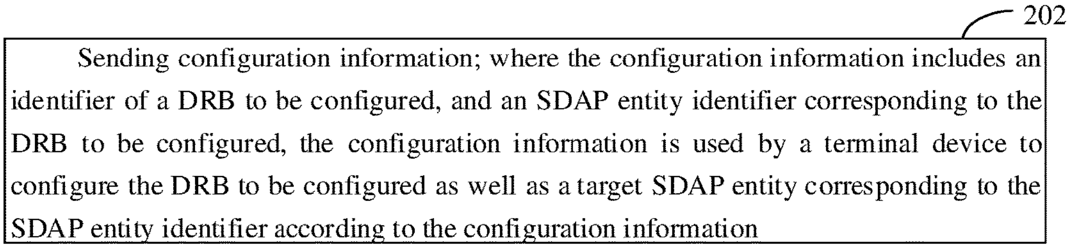
FIG. 4 is a second method flowchart of a method of configuring a Service Data Adaptation Protocol (SDAP) entity according to an embodiment of the present disclosure.

Corresponding to the embodiment, a method of configuring a Service Data Adaptation protocol (SDAP) entity applied to a network-side device is further provided in an embodiment of the present disclosure. In an embodiment of the present disclosure, detailed descriptions of the same portions as the above embodiment may be referred to the above embodiment, which will not be repeated in the present embodiment. FIG. 4 is a second method flowchart of a method of configuring a Service Data Adaptation Protocol (SDAP) entity provided in an embodiment of the present disclosure. The method shown in FIG. 4 includes at least the following step:

Step 202: sending configuration information, where the configuration information includes an identifier of a DRB to be configured, and an SDAP entity identifier corresponding to the DRB to be configured.

The configuration information is configured to enable a terminal device to configure the DRB to be configured and a target SDAP entity corresponding to the SDAP entity identifier according to the configuration information.

Specifically, in Step 202, the configuration information is sent to a terminal device, and the terminal device configures the DRB to be configured and a target SDAP entity corresponding to the SDAP entity identifier according to the configuration information.

The above identifier of the DRB may be an ID of the DRB, and the above SDAP entity identifier may be an ID of the SDAP entity.

There may be one or more DRBs to be configured in the configuration information, and there may be one or more SDAP entities in the configuration information. However, one DRB to be configured corresponds to one SDAP entity, that is, one DRB may only be configured to one SDAP entity. However, one SDAP entity may correspond to multiple DRBs.

For example, in the configuration information, DRBs to be configured are DRB1, DRB2 and DRB3, DRB1 and DRB2 correspond to SDAP1, and DRB3 corresponds to SDAP2, that is, both DRB1 and DRB2 are configured to correspond to SDAP1, and DRB3 is configured to correspond to SDAP2. In this case, DRB1 and DRB2 may no longer be configured to correspond to SDAP2. Similarly, DRB3 may no longer be configured to correspond to SDAP1.

In an embodiment of the present disclosure, one DRB may only correspond to one SDAP entity, so that the DRB may know exactly which SDAP entity to send data to, avoiding confusion of sending data in a case that one DRB corresponds to multiple SDAP entities and the DRB is not sure which SDAP entity to send data to.

The configuring the DRB to be configured by the terminal device according to the configuration information may be deleting the DRB to be configured, establishing the DRB to be configured, or modifying an SDAP entity corresponding to the DRB to be configured, etc. The configuring the target SDAP entity corresponding to the SDAP entity identifier may be deleting the target SDAP entity, or establishing the target SDAP entity, etc.

In an embodiment of the present disclosure, configuration information including the identifier of the DRB to be configured and the SDAP entity identifier corresponding to the DRB to be configured is sent to a terminal device, so that the DRB to be configured is configured by the terminal device according to the configuration information, and configuration of the target SDAP entity corresponding to the SDAP entity identifier may be implemented through the configuration of the DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity to the terminal device, and overhead for configuring the SDAP entity is reduced.

In a specific embodiment of the present disclosure, the configuration information is configured to indicate an establishment of the DRB to be configured;

Correspondingly, the configuration information is further used by the terminal device to establish the DRB to be configured and the target SDAP entity according to the configuration information in a case that the target SDAP entity is not established.

Specifically, in an embodiment of the present disclosure, after the configuration information is sent to the terminal device, the terminal device checks whether the target SDAP entity is established currently or not. The terminal device establishes the aforementioned DRB to be configured and the target SDAP entity, and also needs to establish a corresponding relationship between the DRB to be configured and the target SDAP entity according to the configuration information in a case that the target SDAP entity has not been established.

The terminal device only needs to establish the DRB to be configured and the corresponding relationship between the DRB to be configured and the target SDAP entity in a case that the terminal device has already established the target SDAP entity.

In an embodiment of the present disclosure, establishment of the DRB to be configured is indicated through the configuration information sent to a terminal device, the terminal device itself may be triggered to check whether the target SDAP entity is established or not. If the target SDAP entity is not established, the terminal device is triggered to establish the target SDAP entity, so that configuration signaling for establishing the target SDAP entity does not need to be sent to the terminal device, which saves overhead of the configuration signaling for establishing the target SDAP entity, thereby reducing overhead for configuring the SDAP entity.

In addition, in an embodiment of the present disclosure, the configuration information further includes a PDU session identifier corresponding to the SDAP entity identifier.

Correspondingly, the configuration information is further used by the terminal device to establish a corresponding relationship between the target SDAP entity and a target PDU session corresponding to the PDU session identifier according to the configuration information.

In a specific embodiment of the present disclosure, the configuration information is configured to instruct modifying a first SDAP entity corresponding to the DRB to be configured to the target SDAP entity.

Correspondingly, the configuration information is further configured to, in a case that the target SDAP entity is not established, enable the terminal device to establish the target SDAP entity and a corresponding relationship between the DRB to be configured and the target SDAP entity according to the configuration information.

The modifying the first SDAP entity corresponding to the DRB to be configured to the target SDAP entity refers to modifying a corresponding relationship of the DRB that already exist on the terminal device. That is, the DRB to be configured on the terminal device originally corresponds to the first SDAP entity, and the corresponding relationship of the DRB to be configured needs to be modified to a corresponding relationship between the DRB to be configured and the target SDAP entity, that is, it is necessary to release the correspondence between the DRB to be configured and the first SDAP entity, and establish the correspondence between the DRB to be configured and the target SDAP entity.

In this case, after the network-side device sends the configuration information to the terminal device, the terminal device checks whether the target SDAP entity is established or not. If the target SDAP entity has not been established, the target SDAP entity is established and the corresponding relationship between the DRB to be configured and the target SDAP entity is established according to the configuration information, and the corresponding relationship between the DRB to be configured and the target SDAP entity is released at the same time.

In a case that terminal device has established the above target SDAP entity, the terminal establishes the corresponding relationship between the DRB to be configured and the target SDAP entity according to the configuration information, and release the corresponding relationship between the DRB to be configured and the first SDAP entity.

In an embodiment of the present disclosure, the first SDAP entity corresponding to the DRB to be configured is modified to the target SDAP entity through the configuration information sent to the terminal device, the terminal device itself may be triggered to check whether the target SDAP entity is established or not. If the target SDAP entity is not established, the terminal device is triggered to establish the target SDAP entity, so that configuration signaling for establishing the target SDAP entity does not need to be sent to the terminal device, which saves overhead of the configuration signaling for establishing the target SDAP entity, thereby reducing overhead for configuring the SDAP entity.

In a specific embodiment of the present disclosure, in a case that the DRB to be configured is an entirety of DRBs corresponding to the first SDAP entity.

Correspondingly, the configuration information is further used by the terminal device to delete the first SDAP entity according to the configuration information.

For example, in a specific implementation, the first SDAP entity corresponds to three DRBs, which are recorded as DRB1, DRB2 and DRB3, respectively. If the DRBs to be configured in the configuration information happen to be DRB1, DRB2 and DRB3, after a corresponding relationship of DRB1, DRB2 and DRB3 with the target SDAP entity is established, and a corresponding relationship of DRB1, DRB2 and DRB3 with the first SDAP entity is deleted, the first SDAP entity does not have a corresponding DRB, and at this time, the terminal device is triggered to delete the first SDAP entity.

In an embodiment of the present disclosure, in a case that the configuration information sent to the terminal device is configured to instruct modifying an SDAP entity corresponding to the DRB to be configured that already exists on the terminal device, if the DRB to be configured is an entirety of DRBs corresponding to the first SDAP entity, the terminal device may be triggered to delete the first SDAP entity at this time, so that configuration signaling for deleting the first SDAP entity does not need to be sent to the terminal device, which saves overhead of the configuration signaling for establishing the first SDAP entity, thereby reducing overhead for configuring the SDAP entity.

In addition, in a specific embodiment of the present disclosure, the configuration information is configured to indicate a deletion of the DRB to be configured.

Correspondingly, the configuration information is further used by the terminal device to delete the DRB to be configured and the target SDAP entity according to the configuration information in a case that the target SDAP entity is established and the DRB to be configured is an entirety of DRBs corresponding to the target SDAP entity.

Specifically, in an embodiment of the present disclosure, if the configuration information is configured to indicate a deletion of the DRB to be configured, after the configuration information is sent to the terminal device, the terminal device detects whether the target SDAP entity is established or not, and determines whether the DRB to be configured is an entirety of DRBs corresponding to the target SDAP entity. If the DRB to be configured is an entirety of DRBs corresponding to the target SDAP entity, the DRB to be configured and the target SDAP entity are deleted; if the DRB to be configured is not an entirety of DRBs corresponding to the target SDAP entity, the terminal device only needs to delete the DRB to be configured.

For example, the DRBs to be configured included in the configuration information are DRB1, DRB2 and DRB3, DRB1, DRB2 and DRB3 all correspond to SDAP entity 1, and DRB1, DRB2 and DRB3 are all DRBs corresponding to SDAP entity 1. SDAP entity 1 is deleted at the same time as DRB1, DRB2 and DRB3 in a case that the above configuration information is configured to indicate a deletion of DRB1, DRB2 and DRB3.

In an embodiment of the present disclosure, deletion of the DRB to be configured is indicated through the configuration information sent to the terminal device, the terminal device may be triggered to delete the target SDAP entity in a case that the terminal device detects that the target SDAP entity corresponding to the DRB is established and the DRB to be configured is an entirety of the DRBs corresponding to the target SDAP entity. Thus, when a number of DRBs corresponding to the target SDAP entity is detected to be zero, the terminal device may be triggered to directly delete the target SDAP entity, so that the network-side device does not need to send configuration signaling for deleting the target SDAP entity, which saves overhead of the configuration signaling for deleting the target SDAP entity, thereby reducing overhead for configuring the SDAP entity.

In addition, in an embodiment of the present disclosure, when the target SDAP entity is deleted by the terminal device, the PDU session corresponding to the target SDAP entity on the terminal device does not have a corresponding SDAP entity, thus the terminal device also needs to delete the PDU session corresponding to the target SDAP entity. Therefore, in an embodiment of the present disclosure, the configuration information further includes a PDU session identifier corresponding to the SDAP entity identifier.

Correspondingly, the configuration information is further used by the terminal device to delete a corresponding relationship between the target SDAP entity and a target PDU session corresponding to the PDU session identifier according to the configuration information.

In a method of configuring a Service Data Adaptation protocol (SDAP) entity provided in an embodiment of the present disclosure, configuration information including the identifier of the DRB to be configured and the SDAP entity identifier corresponding to the DRB to be configured is sent to a terminal device, so that the DRB to be configured is configured by the terminal device according to the configuration information, and configuration of the target SDAP entity corresponding to the SDAP entity identifier may be implemented through the configuration of the DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity to the terminal device, and overhead for configuring the SDAP entity is reduced.

Figure 5:
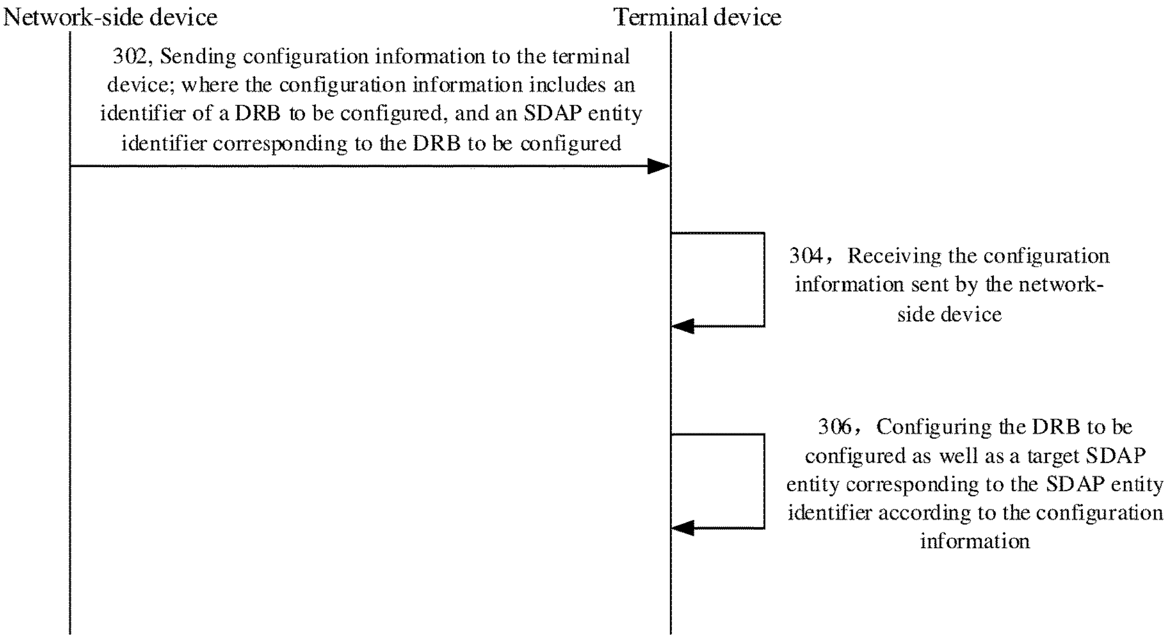
FIG. 5 is a third method flowchart of a method of configuring a Service Data Adaptation Protocol (SDAP) entity according to an embodiment of the present disclosure.

FIG. 5 is a third method flowchart of a method of configuring a Service Data Adaptation protocol (SDAP) entity provided in an embodiment of the present disclosure. The method shown in FIG. 5 includes at least the following steps:

Step 302: sending, by the network-side device, configuration information to the terminal device, where the configuration information includes an identifier of a DRB to be configured, and an SDAP entity identifier corresponding to the DRB to be configured.

Step 304: receiving, by the terminal device, the configuration information sent by the network-side device.

Step 306: configuring, by the terminal device, the DRB to be configured and a target SDAP entity corresponding to the SDAP entity identifier according to the configuration information.

For a specific implementation process of the embodiment of the present disclosure, reference may be made to the description of the foregoing embodiments, which will not be repeated here.

In a method of configuring a Service Data Adaptation protocol (SDAP) entity provided in an embodiment of the present disclosure, the SDAP entity is configured in an implicit manner, so that overhead of configuration signaling for configuring the SDAP entity is reduced by avoiding sending the configuration signaling for configuring the SDAP entity to the terminal device, and overhead for configuring the SDAP entity is reduced.

Corresponding to the method of configuring the Service Data Adaptation protocol (SDAP) entity provided in the foregoing embodiment, a terminal device is further provided in an embodiment of the present disclosure. The terminal device provided in an embodiment of the present disclosure may implement various processes implemented by the terminal device in the foregoing embodiments.

Figure 6:
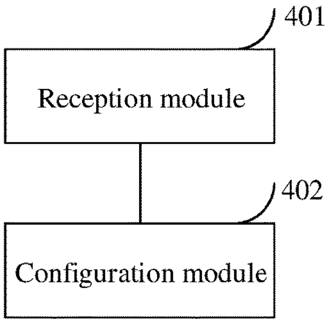
FIG. 6 is a module composition diagram of a terminal device according to an embodiment of the present disclosure.

FIG. 6 is a module composition diagram of a terminal device provided in an embodiment of the present disclosure. The terminal device shown in FIG. 6 includes:

- a reception module 401, configured to receive configuration information, where the configuration information includes an identifier of a DRB to be configured, and an SDAP entity identifier corresponding to the DRB to be configured;

a configuration module 402, configured to configure, according to the configuration information, the DRB to be configured and a target SDAP entity corresponding to the SDAP entity identifier.

Optionally, the configuration information is configured to indicate an establishment of the DRB to be configured;

Correspondingly, the configuration module 402 is further configured to:

establish the DRB to be configured and the target SDAP entity in a case that the target SDAP entity is not established.

Optionally, the configuration information is configured to instruct modifying a first SDAP entity corresponding to the DRB to be configured to the target SDAP entity;

Correspondingly, the configuration module 402 is further configured to:

establish the target SDAP entity and a corresponding relationship between the DRB to be configured and the target SDAP entity in a case that the target SDAP entity is not established.

Optionally, in a case that the DRB to be configured is an entirety of DRBs corresponding to the first SDAP entity, the device further includes:

a first deletion module, configured to delete the first SDAP entity.

Optionally, the configuration information is configured to indicate a deletion of the DRB to be configured;

Correspondingly, the configuration module 402 is further configured to:

delete the DRB to be configured and the target SDAP entity in a case that the target SDAP entity is established and the DRB to be configured is an entirety of DRBs corresponding to the target SDAP entity.

Optionally, one DRB to be configured corresponds to one SDAP entity in the configuration information.

Optionally, the configuration information further includes a PDU session identifier corresponding to the SDAP entity identifier;

Optionally, the device further includes:

a second deletion module, configured to delete a corresponding relationship between the target SDAP entity and a target PDU session corresponding to the PDU session identifier.

Optionally, the device further includes:

a sending module, configured to send a deletion notification message to an NAS entity, where the deletion notification message is configured to notify the NAS entity that the target SDAP entity is deleted.

Optionally, the deletion notification message includes at least one of:

the SDAP entity identifier of the target SDAP entity;

the PDU session identifier of the target PDU session corresponding to the target SDAP entity;

the DRB identifier corresponding to the target SDAP entity.

A terminal device provided in an embodiment of the present disclosure realizes configuration of a target SDAP entity corresponding to a SDAP entity identifier by configuring a DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity again, and overhead for configuring the SDAP entity is reduced.

Corresponding to the method of configuring the Service Data Adaptation protocol (SDAP) entity provided in the foregoing embodiment, the present embodiment provides a network-side device. The network-side device provided in an embodiment of the present disclosure may implement various processes implemented by the network-side device in the foregoing embodiments.

Figure 7:
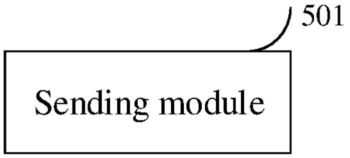
FIG. 7 is a module composition diagram of a network-side device according to an embodiment of the present disclosure.

FIG. 7 is a module composition diagram of a network-side device provided in an embodiment of the present disclosure. The network-side device shown in FIG. 7 includes:

a sending module 501, configured to send configuration information, where the configuration information includes an identifier of a DRB to be configured, and an SDAP entity identifier corresponding to the DRB to be configured;

the configuration information is configured to enable a terminal device to configure the DRB to be configured and a target SDAP entity corresponding to the SDAP entity identifier according to the configuration information.

Optionally, the configuration information is configured to indicate an establishment of the DRB to be configured;

the configuration information is further configured to, in a case that the target SDAP entity is not established, enable the terminal device to establish the DRB to be configured and the target SDAP entity according to the configuration information.

Optionally, the configuration information is configured to instruct modifying a first SDAP entity corresponding to the DRB to be configured to the target SDAP entity;

The configuration information is further configured to, in a case that the target SDAP entity is not established, enable the terminal device to establish the target SDAP entity and a corresponding relationship between the DRB to be configured and the target SDAP entity according to the configuration information.

Optionally, in a case that the DRB to be configured is an entirety of DRBs corresponding to the first SDAP entity, the configuration information is further used by the terminal device to delete the first SDAP entity according to the configuration information.

Optionally, the configuration information is configured to indicate a deletion of the DRB to be configured.

The configuration information is further configured to enable the terminal device to delete the DRB to be configured and the target SDAP entity according to the configuration information in a case that the target SDAP entity is established and the DRB to be configured is an entirety of DRBs corresponding to the target SDAP entity.

Optionally, one DRB to be configured corresponds to one SDAP entity in the configuration information.

Optionally, the configuration information further includes a protocol data unit (PDU) session identifier corresponding to the SDAP entity identifier;

The configuration information is further configured to enable the terminal device to delete a corresponding relationship between the target SDAP entity and a target PDU session corresponding to the PDU session identifier according to the configuration information.

A network-side device provided in an embodiment of the present disclosure sends configuration information including the identifier of the DRB to be configured and the SDAP entity identifier corresponding to the DRB to be configured to a terminal device, so that the DRB to be configured is configured by the terminal device according to the configuration information, and configuration of the target SDAP entity corresponding to the SDAP entity identifier may be implemented through the configuration of the DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity to the terminal device, and overhead for configuring the SDAP entity is reduced.

Corresponding to the method of configuring the Service Data Adaptation protocol (SDAP) entity provided in the foregoing embodiment, the present embodiment provides a terminal device. The terminal device provided in an embodiment of the present disclosure may implement various processes implemented by the terminal device in the foregoing embodiments.

Figure 8:
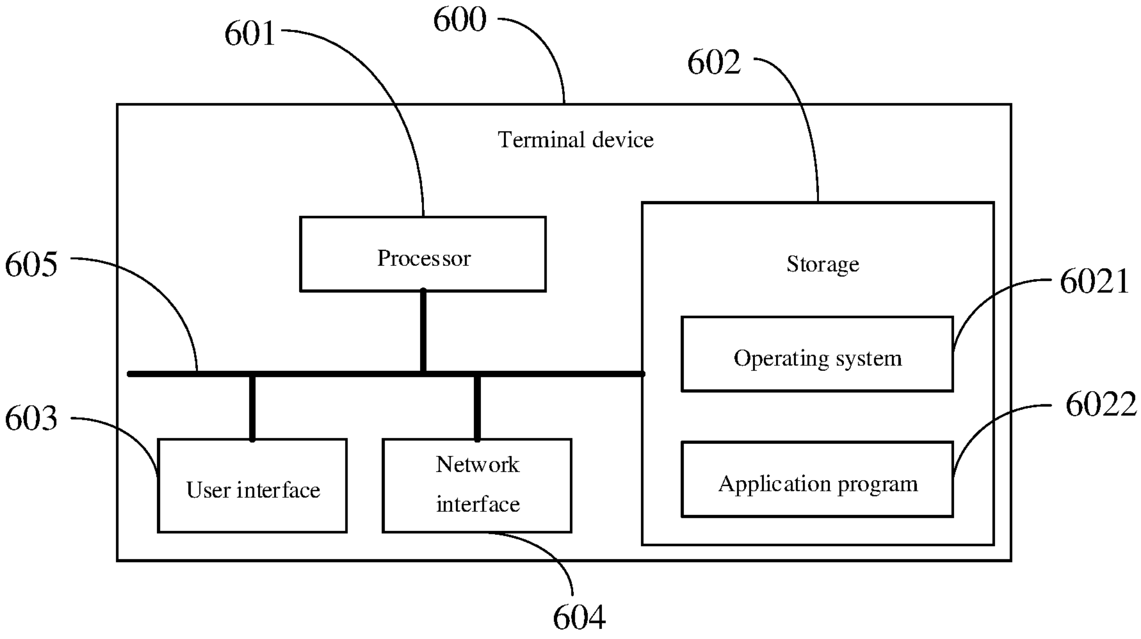
FIG. 8 is a schematic structural diagram of a terminal device according to an embodiment of the present disclosure.

FIG. 8 is a schematic structural diagram of a terminal device provided in an embodiment of the present disclosure, as shown in FIG. 8, a terminal device 600 includes: at least one processor 601, a storage 602, at least one network interface 604 and a user interface 603. The various components in the terminal device 600 are coupled together by a bus system 605. It will be appreciated that the bus system 605 is configured to enable connection communication between these components. The bus system 605 includes a power bus, a control bus, and a status signal bus in addition to the data bus. However, for clarity of description, various buses are labeled as the bus system 605 in FIG. 8.

The user interface 603 may include a display, a keyboard, or a point-and-click device (e.g., a mouse), a trackball, a touchpad, or a touch screen, etc.

It should be understood that, the storage 602 in embodiments of the present disclosure may be either a volatile storage or a non-volatile storage, or may include both a volatile storage and a non-volatile storage. The non-volatile storage may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile storage may be a random access memory (Random Access Memory, RAM) that acts as an external cache. By way of example and not limitation, many forms of RAMs are available, such as a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDRSDRAM), an enhanced SDRAM (Enhanced SDRAM, ESDRAM), a synchlink DRAM (Synchlink DRAM, SLDRAM) and a direct rambus RAM (Direct Rambus RAM, DRRAM). The storage 602 of the systems and methods described in the embodiments of the present disclosure is intended to include, but is not limited to, these and any other suitable types of memory.

In some embodiments, the storage 602 stores the following elements, executable modules or data structures, or a subset thereof, or extended set thereof: an operating system 6021 and an application program 6022.

The operating system 6021 includes various system programs, such as a framework layer, a core library layer, a driver layer, and the like, for implementing various basic services and processing hardware-based tasks. The application program 6022 includes various application programs, such as a media player, a browser, and the like, for implementing various application services. A program implementing the methods of embodiments of the present disclosure may be included in the application program 6022.

In an embodiment of the present disclosure, the terminal device 600 further includes: a storage 602, a processor 601, and a computer program stored in the storage 602 and executable by the processor 601. The computer program is executed by the processor 601 to implement the following steps:

receiving configuration information, where the configuration information includes an identifier of a data radio bearer (DRB) to be configured, and an SDAP entity identifier corresponding to the DRB to be configured;

configuring the DRB to be configured and a target SDAP entity corresponding to the SDAP entity identifier according to the configuration information.

The above method disclosed in the embodiment of the present disclosure may be applied to the processor 601 or implemented by the processor 601. The processor 601 may be an integrated circuit chip having a processing capability of signals. In an implementation process, each step of the above method may be completed by an integrated logic circuit in hardware in the processor component or by an instruction in a form of software. The processor 601 may be a general purpose processor, digital signal processor (Digital Signal Processor, DSP), application specific integrated circuit (Application Specific Integrated Circuit, ASIC), field programmable gate array (Field Programmable Gate Array, FPGA) or other programmable logic device, discrete gate or transistor logic device, discrete hardware component. Various method, step, and logical block diagram disclosed in the embodiment of the present disclosure may be implemented or carried out. The general purpose processor may be a microprocessor, any conventional processor, etc. The steps of the method disclosed in the embodiment of the present disclosure may be embodied directly by the hardware decoding processor, or by a combination of hardware and software modules in the hardware decoding processor. The software modules may reside in well-established computer readable storage medium in the art, such as a RAM, flash memory, ROM, PROM or EEPROM, register. The computer readable storage medium resides in the storage 602. The processor 601 reads information from the storage 602 and performs the steps of the methods with its hardware. Specifically, a computer program is stored on the computer readable storage medium. When the computer program is executed by the processor 601, various steps in embodiments described above are implemented.

It is to be understood that the embodiments described in embodiments of the present disclosure can be implemented in hardware, software, firmware, middleware, microcode, or any combination thereof. For hardware implementation, processing units may be implemented in one or more application specific integrated circuits (Application Specific Integrated Circuits, ASIC), digital signal processors (Digital Signal Processing, DSP), DSP devices (DSP Device, DSPD), programmable logic devices (Programmable Logic Device, PLD), field programmable gate arrays (Field-Programmable Gate Array, FPGA), general purpose processors, controllers, microcontrollers, microprocessors, other electronic units configured to perform the function described in the present disclosure or a combination thereof.

For software implementation, the techniques described in an embodiment of the present disclosure can be implemented by modules (e.g., procedures, functions, etc.) that perform the functions described in an embodiment of the present disclosure. The software code can be stored in the storage and executed by the processor. The storage can be implemented within the processor or external to the processor.

Optionally, when the computer program is executed by the processor 601, the configuration information is configured to indicate an establishment of the DRB to be configured.

The configuring the DRB to be configured and the target SDAP entity corresponding to the SDAP entity identifier according to the configuration information includes:

establishing the DRB to be configured and the target SDAP entity in a case that the target SDAP entity is not established.

Optionally, when the computer program is executed by the processor 601, the configuration information is configured to instruct modifying a first SDAP entity corresponding to the DRB to be configured to the target SDAP entity.

The configuring the DRB to be configured and the target SDAP entity corresponding to the SDAP entity identifier according to the configuration information includes:

establishing the target SDAP entity and a corresponding relationship between the DRB to be configured and the target SDAP entity in a case that the target SDAP entity is not established.

Optionally, when the computer program is executed by the processor 601, in a case that the DRB to be configured is an entirety of DRBs corresponding to the first SDAP entity, the device further includes:

deleting the first SDAP entity.

Optionally, when the computer program is executed by the processor 601, the configuration information is configured to indicate a deletion of the DRB to be configured.

The configuring the DRB to be configured and the target SDAP entity corresponding to the SDAP entity identifier according to the configuration information includes:

deleting the DRB to be configured and the target SDAP entity in a case that the target SDAP entity is established and the DRB to be configured is an entirety of DRBs corresponding to the target SDAP entity.

Optionally, when the computer program is executed by the processor 601, one DRB to be configured corresponds to one SDAP entity in the configuration information.

Optionally, when the computer program is executed by the processor 601, the configuration information further includes a protocol data unit (PDU) session identifier corresponding to the SDAP entity identifier.

Subsequent to deleting the DRB to be configured and the target SDAP entity, the method further includes:

deleting a corresponding relationship between the target SDAP entity and a target PDU session corresponding to the PDU session identifier.

Optionally, when the computer program is executed by the processor 601, the method further includes:

sending a deletion notification message to a non-access stratum (NAS) entity, where the deletion notification message is configured to notify the NAS entity that the target SDAP entity is deleted.

Optionally, when the computer program is executed by the processor 601, the deletion notification message includes at least one of:

the SDAP entity identifier of the target SDAP entity;

the PDU session identifier of the target PDU session corresponding to the target SDAP entity;

the DRB identifier corresponding to the target SDAP entity.

A terminal device provided in an embodiment of the present disclosure realizes configuration of a target SDAP entity corresponding to a SDAP entity identifier by configuring a DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity again, and overhead for configuring the SDAP entity is reduced.

The terminal device 600 can implement various processes implemented by the terminal device in the foregoing embodiments and details are not described herein again to avoid repetition.

Corresponding to the method of configuring the Service Data Adaptation protocol (SDAP) entity provided in the foregoing embodiment, the present embodiment provides a network-side device. The network-side device provided in an embodiment of the present disclosure may implement various processes implemented by the network-side device in the foregoing embodiments.

Figure 9:
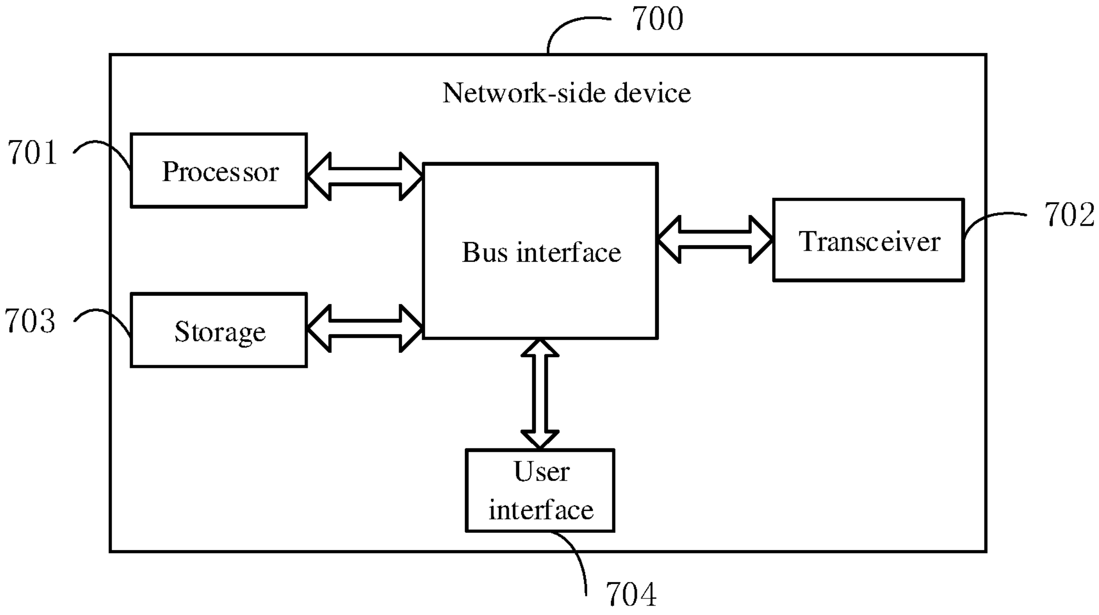
FIG. 9 is a schematic structural diagram of a network-side device according to an embodiment of the present disclosure.

FIG. 9 is a schematic structural diagram of a network-side device provided in an embodiment of the present disclosure, as shown in FIG. 9, a network-side device 700 includes: a processor 701, a transceiver 702, a storage 703, a user interface 704 and a bus interface.

In an embodiment of the present disclosure, the network-side device 700 further includes: a computer program stored in the storage 703 and executable by the processor 701. The computer program is executed by the processor 701 to implement the following steps:

sending configuration information, where the configuration information includes an identifier of a data radio bearer (DRB) to be configured, and an SDAP entity identifier corresponding to the DRB to be configured.

The configuration information is configured to enable a terminal device to configure the DRB to be configured and a target SDAP entity corresponding to the SDAP entity identifier according to the configuration information.

In FIG. 9, a bus architecture may include any number of interconnected buses and bridges. Various circuits, specifically, one or more processors represented by the processor 701 and a storage represented by the storage 703, are linked together. The bus architecture may also link various other circuits such as peripherals, voltage regulators and power management circuits, which are well known in the art, and therefore a further description is omitted herein. The bus interface provides interfaces. The transceiver 702 may be a plurality of elements, that is, includes a transmitter and a receiver, to provide units configured to communicate with various other apparatuses over a transmission medium. For different terminal devices, the user interface 704 can also be an interface capable of externally/internally connecting the required devices which including but not limited to a keypad, a display, a speaker, a microphone, a joystick, and the like.

The processor 701 is responsible for managing the bus architecture and general processing, and the storage 703 may store data used by the processor 701 when performing operations.

Optionally, in a case that the computer program is executed by the processor 701, the configuration information is configured to indicate an establishment of the DRB to be configured;

The configuration information is further configured to, in a case that the target SDAP entity is not established, enable the terminal device to establish the DRB to be configured and the target SDAP entity according to the configuration information.

Optionally, when the computer program stored in the storage 703 is executed by the processor 701, the configuration information is configured to instruct modifying a first SDAP entity corresponding to the DRB to be configured to the target SDAP entity.

The configuration information is further configured to, in a case that the target SDAP entity is not established, enable the terminal device to establish the target SDAP entity and a corresponding relationship between the DRB to be configured and the target SDAP entity according to the configuration information.

Optionally, when the computer program stored in the storage 703 is executed by the processor 701, in a case that the DRB to be configured is an entirety of DRBs corresponding to the first SDAP entity;

The configuration information is further configured to enable the terminal device to delete the first SDAP entity according to the configuration information.

Optionally, when the computer program stored in the storage 703 is executed by the processor 701, the configuration information is configured to indicate a deletion of the DRB to be configured.

The configuration information is further configured to enable the terminal device to delete the DRB to be configured and the target SDAP entity according to the configuration information in a case that the target SDAP entity is established and the DRB to be configured is an entirety of DRBs corresponding to the target SDAP entity.

Optionally, when the computer program stored in the storage 703 is executed by the processor 701, one DRB to be configured corresponds to one SDAP entity in the configuration information.

Optionally, when the computer program stored in the storage 703 is executed by the processor 701, the configuration information further includes a protocol data unit (PDU) session identifier corresponding to the SDAP entity identifier.

The configuration information is further used by the terminal device to delete a corresponding relationship between the target SDAP entity and a target PDU session corresponding to the PDU session identifier according to the configuration information.

In an embodiment of the present disclosure, configuration information including the identifier of the DRB to be configured and the SDAP entity identifier corresponding to the DRB to be configured is sent to a terminal device, so that the DRB to be configured is configured by the terminal device according to the configuration information, and configuration of the target SDAP entity corresponding to the SDAP entity identifier may be implemented through the configuration of the DRB. That is, in an embodiment of the present disclosure, the SDAP entity is configured in an implicit manner, so that overhead of configuration signaling for configuring the SDAP entity is reduced by avoiding sending the configuration signaling for configuring the SDAP entity to the terminal device, and overhead for configuring the SDAP entity is reduced.

The network-side device 700 can implement various processes implemented by the network-side device in the foregoing embodiments, the same technical effect may be achieved, and details are not described herein again to avoid repetition.

A computer readable storage medium is further provided in an embodiment of the present disclosure, a processor executes the computer program to perform the method of configuring the Service Data Adaptation protocol (SDAP) entity in embodiments of the present disclosure, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of embodiments of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In some embodiments provided in embodiments of the present disclosure, it should be understood that the disclosed system, device and method may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solution of the embodiments.

In addition, each functional unit in each of embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of embodiments of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the method according to each of embodiments of the present disclosure. The foregoing storage medium includes various media that may store program codes, such as a USB flash drive, a mobile hard disk, a read-only memory (Read-Only Memory, ROM), a random access memory (Random Access Memory, RAM), a magnetic disk, or an optical disk, etc.

The foregoing descriptions are merely embodiments of the present disclosure, and are not used to limit the present disclosure. For those skilled in the art, there may be various modifications and changes in the present disclosure. Any modification, equivalent replacement and improvement made within the spirit and principle of the present disclosure shall be included in the scope of the claims of the present disclosure.

What is claimed is:

1. A non-transitory computer readable storage medium storing a computer program, wherein a processor of a terminal device executes the computer program to:

receive configuration information sent by a network-side device, wherein the configuration information comprises identifiers of one or more to-be-deleted data radio bearers (DRBs) which correspond to an established target SDAP entity;

in response to the configuration information, delete the one or more to-be-deleted DRBs;

determine whether the number of DRBs corresponding to the established target SDAP entity becomes zero following the deletion of the one or more to-be-deleted DRBs; and delete the established target SDAP entity, in a case that it is determined that the number of DRBs corresponding to the established target SDAP entity becomes zero.

2. The non-transitory computer readable storage medium according to claim 1, wherein one DRB corresponds to one SDAP entity in the configuration information.

3. The non-transitory computer readable storage medium according to claim 1, wherein the configuration information further comprises: a protocol data unit (PDU) session identifier corresponding to the established target SDAP entity;

wherein the processor of the terminal device executes the computer program to:

delete a corresponding relationship between the established target SDAP entity and a target PDU session corresponding to the PDU session identifier.

4. A non-transitory computer readable storage medium, storing therein a computer program, wherein a processor of a network-side device executes the computer program to:

send configuration information to a terminal device, wherein the configuration information comprises identifiers of one or more to-be-deleted DRBs which correspond to an established target SDAP entity;

wherein the configuration information is further used by the terminal device to:

delete the one or more to-be-deleted DRBs in response to the configuration information;

determine whether the number of DRBs corresponding to the established target SDAP entity becomes zero following the deletion of the one or more to-be-deleted DRBs; and in a case that it is determined that the number of DRBs corresponding to the established target SDAP entity becomes zero, delete the established target SDAP entity.

5. The non-transitory computer readable storage medium according to claim 4, wherein one DRB corresponds to one SDAP entity in the configuration information.

6. A network-side device, comprising:

a storage, a processor, and a program stored on the storage and executable by the processor, wherein the processor executes the computer program to:

send configuration information to a terminal device, wherein the configuration information comprises identifiers of one or more to-be-deleted DRBs which correspond to an established target SDAP entity;

wherein the configuration information is further used by the terminal device to:

delete the one or more to-be-deleted DRBs in response to the configuration information;

determine whether the number of DRBs corresponding to the established target SDAP entity becomes zero following the deletion of the one or more to-be-deleted DRBs; and in a case that it is determined that the number of DRBs corresponding to the established target SDAP entity becomes zero, delete the established target SDAP entity.

7. The network-side device according to claim 6, wherein one DRB corresponds to one SDAP entity in the configuration information.

* * * * *